United States Patent
Liu et al.

(10) Patent No.: US 10,555,001 B2
(45) Date of Patent: Feb. 4, 2020

(54) METHOD OF VIDEO CODING USING PREDICTION BASED ON INTRA PICTURE BLOCK COPY

(71) Applicant: MediaTek Singapore Pte. Ltd., Singapore (SG)

(72) Inventors: Shan Liu, San Jose, CA (US); Xiaozhong Xu, Fremont, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 204 days.

(21) Appl. No.: 15/107,916

(22) PCT Filed: Feb. 17, 2015

(86) PCT No.: PCT/CN2015/073225
§ 371 (c)(1),
(2) Date: Jun. 23, 2016

(87) PCT Pub. No.: WO2015/124110
PCT Pub. Date: Aug. 27, 2015

(65) Prior Publication Data
US 2016/0330474 A1 Nov. 10, 2016

Related U.S. Application Data

(60) Provisional application No. 61/954,181, filed on Mar. 17, 2014, provisional application No. 61/942,819, filed on Feb. 21, 2014.

(51) Int. Cl.
*H04N 19/176* (2014.01)
*H04N 19/593* (2014.01)
(Continued)

(52) U.S. Cl.
CPC ........ *H04N 19/56* (2014.11); *H04N 19/132* (2014.11); *H04N 19/523* (2014.11)

(58) Field of Classification Search
CPC .... H04N 19/56; H04N 19/523; H04N 19/132; H04N 19/503
(Continued)

(56) References Cited

U.S. PATENT DOCUMENTS

| 2013/0272375 | A1 | 10/2013 | Yu et al. |
| 2014/0105299 | A1* | 4/2014 | Chen ............... H04N 19/00424 375/240.15 |

(Continued)

FOREIGN PATENT DOCUMENTS

| CN | 102438147 A | 5/2012 |
| CN | 103026709 A | 4/2013 |

(Continued)

OTHER PUBLICATIONS

International Search Report dated May 22, 2015, issued in application No. PCT/CN2015/073225.

(Continued)

*Primary Examiner* — Susan E. Hodges
(74) *Attorney, Agent, or Firm* — Oblon, McClelland, Maier & Neustadt, L.L.P.

(57) ABSTRACT

A method of signaling of coding mode including an IntraBC mode (Intra-block copy mode) and inter prediction mode for a picture, wherein the picture is divided into multiple coding units, the method includes receiving input data associated with a current prediction unit in a current picture, and responsive to the IntraBC mode being selected for the current prediction unit: encoding or decoding the current prediction unit using an IntraBC predictor derived based on an IntraBC reference picture selected from a reference picture list, wherein the reference picture list includes the IntraBC reference picture containing one or more reconstructed IntraBC blocks and one or more Inter reference pictures corresponding to one or more reconstructed Inter- (Continued)

coded pictures; generating a first reconstructed current block after said encoding or decoding the current prediction unit; and updating the IntraBC reference picture according to the first reconstructed current block.

15 Claims, 3 Drawing Sheets

(51) Int. Cl.
*H04N 19/52* (2014.01)
*H04N 19/56* (2014.01)
*H04N 19/132* (2014.01)
*H04N 19/523* (2014.01)

(58) Field of Classification Search
USPC .......................................................... 375/240
See application file for complete search history.

(56) References Cited

U.S. PATENT DOCUMENTS

| | | | |
|---|---|---|---|
| 2014/0301465 A1* | 10/2014 | Kwon | H04N 19/503 375/240.16 |
| 2014/0376634 A1* | 12/2014 | Guo | H04N 19/52 375/240.16 |
| 2015/0063440 A1* | 3/2015 | Pang | H04N 19/174 375/240.02 |
| 2015/0103915 A1* | 4/2015 | Xu | H04N 19/593 375/240.16 |
| 2015/0229933 A1* | 8/2015 | Guo | H04N 19/103 375/240.02 |
| 2016/0173905 A1 | 6/2016 | Lin et al. | |

FOREIGN PATENT DOCUMENTS

| | | |
|---|---|---|
| CN | 103079067 | 5/2013 |
| CN | 103202014 | 7/2013 |
| WO | 2010/021664 A1 | 2/2010 |
| WO | WO 2016/061245 A1 | 4/2016 |

OTHER PUBLICATIONS

Pang, C. et al.; "Non-RCE3; 2-D MVs Supported Intra Motion Compensation with 2-D MVz;" Joint Collaborative Team on Video Coding (JCT-VC) of ITU-T SG 16 WP 3 and ISO/IEC JTC 1/SC 29/WG 11; 14th Meeting; Vienna, AT Jul. 25-Aug. 2, 2013 (Aug. 2, 2013) JCTVC-N0256; pp. 1-12.

Cohen, R.; "Non-RCE2: Cross-verification of JCTVC-N0137, Golomb-rice parameter initialization for transform skip and transquant bypass modes;" Joint Collaborative Team on Video Coding (JCT-VC) of ITU-T SG 16 WP 3 and ISO/IEC JTC 1/SC 29/WG 11; Aug. 2013; pp. 1-2.

Budagavi, M., et al.; "Video coding using Intra motion compensation;" Joint Collaborative Team on Video Coding (JCT-VC) of ITU-T SG 16 WP 3 and ISO/IEC JTC 1/SC 29/WG 11; Apr. 2013; pp. 1-3.

Li, B., et al; "Non-SCCE1-Unification of intra BC and inter modes;" Joint Collaborative Team on Video Coding (JCT-VC) of ITU-T SG 16 WP 3 and ISO/IEC JTC 1/SC 29/WG 11; Jun.-Jul. 2014; pp. 1-28.

Xu, X., et al.; "On unification of intra block copy and inter-picture motion compensation;" Joint Collaborative Team on Video Coding (JCT-VC) of ITU-T SG 16 WP 3 and ISO/IEC JTC 1/SC 29/WG 11; Jan. 2014; pp. 1-14.

Office Action dated Jul. 25, 2019 in Indian Patent Application No. 201627025049. p. 1-6.

\* cited by examiner

METHOD OF VIDEO CODING USING PREDICTION BASED ON INTRA PICTURE BLOCK COPY

CROSS REFERENCE TO RELATED APPLICATIONS

The present invention claims priority to U.S. Provisional Patent Application, Ser. No. 61/942,819, filed on Feb. 21, 2014 and U.S. Provisional Patent Application, Ser. No. 61/954,181, filed on Mar. 17, 2014. The U.S. Provisional Patent Applications are hereby incorporated by reference in their entireties.

FIELD OF THE INVENTION

The present invention relates to video coding using Intra-block copy (IntraBC) mode. In particular, the present invention relates to techniques to improve the performance or simplify the processing of the Intra-block copy (IntraBC) coding mode for screen content coding or video coding.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

In the current development of range extension (RExt) or screen content coding for High Efficiency Video Coding (HEVC) standard, some tools have been adopted due to their improvements in coding efficiency for screen contents. For Intra blocks, Intra prediction according to the conventional approach is performed using prediction based on reconstructed pixels from neighboring blocks. Intra prediction may select an Intra Mode from a set of Intra Modes, which include a vertical mode, horizontal mode and various angular prediction modes. For HEVC Range Extension and screen content coding, a new Intra coding mode, named Intra-block copy (IntraBC) has been used. The IntraBC technique that was originally proposed by Budagavi in *AHG8: Video coding using Intra motion compensation*, Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, Document: JCTVC-M0350 (hereinafter JCTVC-M0350). An example according to JCTVC-M0350 is shown in FIG. 1, where a current coding unit (CU, 110) is coded using Intra MC (motion compensation). The prediction block (120) is located from the current CU and a displacement vector (112). In this example, the search area is limited to the current CTU (coding tree unit), the left CTU and the left-left CTU. The prediction block is obtained from the already reconstructed region. Then, the displacement vector, also named motion vector (MV), and residual for the current CU are coded. It is well known that the HEVC adopts CTU and CU block structure as basic units for coding video data. Each picture is divided into CTUs and each CTU is reclusively divided into CUs. During prediction phase, each CU may be divided into multiple blocks, named prediction units (PUs) for performing prediction process. After prediction residue is formed for each CU, the residue associated with each CU is divided into multiple blocks, named transform units (TUs) to apply transform (such as discrete cosine transform (DCT)).

In JCTVC-M0350, the Intra MC is different from the motion compensation used for Inter prediction in at least the following areas:
  MVs are restricted to be 1-D for Intra MC (i.e., either horizontal or vertical) while Inter prediction uses 2-D motion estimation.
  Binarization is fixed length for Intra MC while Inter prediction uses exponential-Golomb.
  Intra MC introduces a new syntax element to signal whether the MV is horizontal or vertical.

Based on JCTVC-M0350, some modifications are disclosed by Pang, et al. in *Non-RCE3: Intra Motion Compensation with 2-D MVs*, Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, Document: JCTVC-N0256 (hereinafter JCTVC-N0256). Firstly, the Intra MC is extended to support 2-D MVs, so that both MV components can be non-zero at the same time. This provides more flexibility to Intra MC than the original approach, where the MV is restricted to be strictly horizontal or vertical.

In JCTVC-N0256, two MV coding methods were disclosed:
  Method 1—Motion vector prediction. The left or above MV is selected as the MV predictor and the resulting motion vector difference (MVD) is coded. A flag is used to indicate whether the MVD is zero. When MVD is not zero, exponential-Golomb codes of the 3rd order are used to code the remaining absolute level of the MVD. Another flag is used to code the sign.
  Method 2: No Motion vector prediction. The MV is coded using the exponential-Golomb codes that are used for MVD in HEVC.

Another difference disclosed in JCTVC-N0256 is that the 2-D Intra MC is further combined with the pipeline friendly approach:
  1. No interpolation filters are used,
  2. MV search area is restricted. Two cases are disclosed:
    a. Search area is the current CTU and the left CTU or
    b. Search area is the current CTU and the rightmost 4 column samples of the left CTU.

Among the proposed methods in JCTVC-N0256, the 2-D Intra MC, the removal of interpolation filters, and the search area constraint to the current CTU and the left CTU have been adopted in a new version draft standard. The CU level syntax corresponding to JCTVC-N0256 has been incorporated in *High Efficiency Video Coding (HEVC) Range Extension text specification: Draft 4 (RExt Draft 4)*, Flynn, et al., Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, Document: JCTVC-N1005.

It is desirable to further improve the performance of IntraBC mode. Furthermore, it is desirable maintain any new development within the same framework of existing HEVC standard.

BRIEF SUMMARY OF THE INVENTION

A method of video coding including an IntraBC (Intra Block Copy) mode is disclosed. In one embodiment, the reference picture list includes an IntraBC reference picture corresponding to the current picture. The part of this picture which is prior to the current block (e.g. coding unit or coding block) in coding and reconstruction order is filled with reconstructed pixel, while the other part which is after the current block in coding and reconstruction order is empty in one embodiment, or filled with other values in general. If the IntraBC mode is selected for a current coding unit, the current coding unit is encoded or decoded using an IntraBC predictor derived based on the IntraBC reference picture selected from a reference picture list. The reference picture list includes the IntraBC reference picture, it may also include one or more Inter reference pictures corresponding to one or more previously reconstructed Inter-coded pictures. It is also possible that the reference list includes only the IntraBC reference picture. After said encoding or decoding is applied to the current coding unit, a first reconstructed current block is generated and used for updating the IntraBC reference picture. The reference picture list may correspond to reference picture list 10 or reference picture list 11. Furthermore, when the Inter prediction mode is selected for the current coding unit, the current coding unit is encoded or decoded using an Inter predictor derived based on at least one Inter reference picture selected from the reference picture list. After said encoding or decoding is applied to the current coding unit, a second reconstructed current block is generated and used for updating the IntraBC reference picture.

The IntraBC reference picture can be included in the reference picture list by replacing one existing Inter reference picture or included in the reference picture list as a new reference picture. The IntraBC reference picture may be placed at a last reference picture in the reference picture list or in a selected location. The selected location can be signaled in a sequence level, picture level, or slice level, or the selected location can be inferred. When the IntraBC reference picture is included in the reference picture list as the new reference picture, the IntraBC reference picture is initialized as an empty picture. When the IntraBC reference picture is included in the reference picture list by replacing one existing Inter reference picture, the IntraBC reference picture is initialized as said one existing Inter reference picture. The first reconstructed current block can be filtered using a filter, such as sample adaptive offset (SAO), before the first reconstructed current block is used to update the IntraBC reference picture.

In another embodiment, method for deriving motion vector predictor (MVP) or one or more Merge/Skip candidates for the MV of the current block is disclosed. If the current prediction mode is an IntraBC mode, a first MVP is determined based on one or more first MVs associated with one or more first neighboring blocks of the current block or one or more first Merge/Skip candidates are determined based on one or more second MVs associated with one or more second neighboring blocks of the current block. The current motion vector associated with the IntraBC mode is encoded or decoded based on the first MVP or said one or more first Merge/Skip candidates.

In one example, the MV associated with one neighboring block is regarded as a valid first MVP candidate or a valid first Merge/Skip candidate only when said one neighboring block is coded in the IntraBC mode. In another example, the MV associated with one neighboring block is regarded as a valid second MVP candidate or a valid second Merge/Skip candidate only when said one neighboring block is coded in the Inter mode. Alternatively, the MV associated with one neighboring block can be regarded as a valid second MVP candidate or a valid second Merge/Skip candidate when said one neighboring block is coded in the Inter mode. Similarly, the MV associated with one neighboring block can be regarded as a valid first MVP candidate or a valid first Merge/Skip candidate when said one neighboring block is coded in the IntraBC mode.

The neighboring blocks of the current block may include five spatial neighboring blocks consisting of an upper-right block, a right-aligned top block and an upper-left block, a lower-left block and a bottom-aligned left block. Said one or more first Merge/Skip candidates may correspond to a current IntraBC MVP, a last coded IntraBC MV, or the MV of a left neighboring block or an above neighboring block of the current block. The first MVP or said one or more first Merge/Skip candidates may be restricted to integer values.

DETAILED DESCRIPTION OF THE INVENTION

Figure 1:
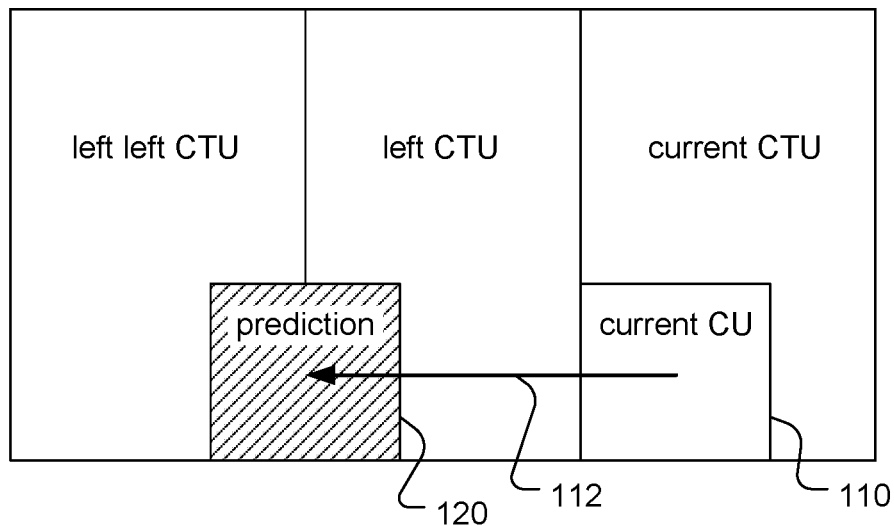
FIG. 1 illustrates an example of Intra motion compensation according to the Intra-block copy (IntraBC) mode, where a horizontal displacement vector is used.
Figure 2:
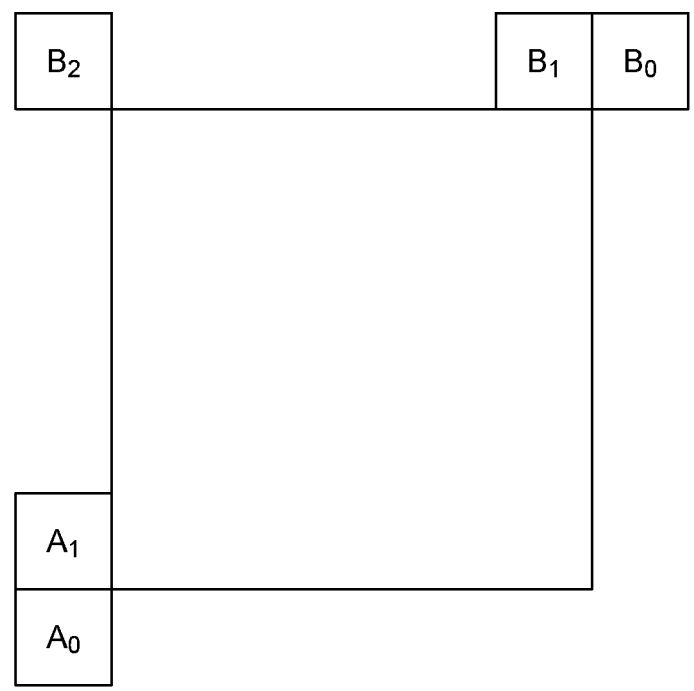
FIG. 2 illustrates an example of neighboring block configuration used to derive motion vector predictor for IntraBC mode.

In the current Intra Picture Block Copy (IntraBC) technique as mentioned above, the IntraBC is a separate and additional mode to Intra and Inter prediction. The IntraBC predictors are additional predictors to the Intra and Inter predictors that are already used in the HEVC coding system. Furthermore, the block matching search is needed to determine IntraBC "block vectors", which corresponds to additional computations to the motion search needed to derive the motion vectors for Inter prediction. In the present invention, a method of Intra picture block prediction (i.e. IntraBC) technique is disclosed to align it with Inter block prediction so that IntraBC can potentially be realized without block level change to the existing HEVC main profile codec.

IntraBC PU Representation and Signaling.

In the present invention, an "IntraBC reference picture" (referred as ibc_ref_pic in the following text) is treated in the same way as an Inter reference picture. In current HEVC, there are two reference lists for Inter prediction, i.e. l0 and l1 corresponding to list 0 and list 1. For example, the ibc_ref_pic can be inserted into one of the two reference lists, l0 or l1 as an additional reference picture to the Inter reference pictures. If there is only one reference list, then ibc_ref_pic is inserted into this reference list. In another embodiment, the ibc_ref_pic can be inserted into both reference lists, l0 and l1 as an additional reference picture to the Inter reference pictures. The ibc_ref_pic can be placed in the last position in the reference list, i.e. after the last Inter reference picture. However, the ibc_ref_pic can also be inserted into reference list and placed in a specific position.

This position may be explicitly signaled in the slice, picture or sequence level, or inferred.

In another embodiment, the ibc_ref_pic is placed into the reference list (either l0 or l1 if there are two reference lists) to replace one of the existing Inter reference pictures. For example, the ibc_ref_pic can be placed in the reference list to replace the last Inter reference picture. In another example, the ibc_ref_pic is inserted into reference list to replace one Inter reference picture in a specific position. This position may be explicitly signaled in slice, picture or sequence level, or inferred.

According to another embodiment, the IntraBC PU processes are aligned with the HEVC Inter PU processes, including motion vector representation and coding, signaling, etc. In other words, the IntraBC coded blocks (i.e., PUs) are processed in the same way as Inter predicted blocks (i.e., PUs) except that the predictors are from an "IntraBC reference picture" instead of an "Inter reference picture". Furthermore, the IntraBC processing can be enabled or disabled at the PU level. In other words, various types of PUs, such as IntraBC PU, Inter PU and Intra PU may exist within the same CU.

Construction of IntraBC Reference Picture.

If the ibc_ref_pic is appended or inserted into the reference list as an addition to the Inter reference pictures and the corresponding reference picture can be initialized as an empty (NULL) picture. Through the coding (encoding or decoding) process, the empty reference picture is gradually filled up by the reconstructed pixels of the currently coded picture, which is the IntraBC reference picture. The pixel values are updated block by block and the block size can be dependent on the implementation platform such as 4×4, 8×8, CU or LCU. At the encoder side, the motion vector (or block vector) search range for this reference picture may be restricted to the area that has been updated with valid reconstructed pixel values.

If the ibc_ref_pic is inserted into the reference list as a replacement of one of the Inter reference pictures, initially the ibc_ref_pic is equal to the existing Inter reference picture. Through the coding (encoding or decoding) process, the pixel values of this Inter reference picture are gradually replaced by the reconstructed pixels of the currently coded picture. The pixel values are updated block by block and the block size is dependent on the implementation platform such as 4×4, 8×8, CU or LCU. At the encoder side, the search range of this reference picture may be restricted to the area which has been updated with newly reconstructed pixel values. However, at the encoder side, the search range of this reference picture can be the same as other regular Inter reference pictures.

Vector Prediction of IntraBC Using AMVP.

In another embodiment, advanced motion vector prediction (AMVP) method used in HEVC is applied for predicting the block vector of IntraBC PU. The block vector for an IntraBC block is treated similarly as a motion vector of an Inter coded block. Accordingly, the term "motion vector (MV)" may also refer to the "block vector (BV)" in this disclosure. The same five neighboring candidate positions as the five spatial AMVP in HEVC for MV prediction can be used for block vector. However, other neighboring block configuration may also be used for block vector prediction. In one embodiment, for a current block coded in the IntraBC mode, the MV (BV) of a neighboring block can be regarded as a valid candidate MV (BV) predictor only if the neighboring block is coded in the IntraBC mode. Similarly, for a current block coded in the Inter mode, the MV of a neighboring block can be regarded as a valid candidate MV predictor only if the neighboring block is coded in the Inter mode.

In the above example, the motion vector associated with a neighboring block is regarded as valid only if the neighboring block is coded in the same prediction mode (i.e., Inter or IntraBC mode) as the current block. Nevertheless, the MV of an Inter coded neighboring PU may also be regarded as a valid MV predictor for the current IntraBC PU. Similarly, the MV of an IntraBC coded neighboring PU may also be regarded as a valid MV predictor for the current Inter PU. The prediction from a MV of an IntraBC coded PU to a current Inter PU, or the prediction from a MV of an Inter coded PU to a current IntraBC PU can be direct prediction, or after proper modification, such as shifting. In one embodiment, the MV of an IntraBC coded PU needs to be left shifted by 2 when it is used as a predictor for an Inter PU; the MV of an Inter coded PU needs to be right shifted by 2 when it is used as a predictor for an IntraBC PU.

Merge/Skip Mode for IntraBC PU.

In this embodiment, the Merge/Skip mode as used in HEVC is applied to encode a PU coded in the IntraBC mode. When coded in the Merge or Skip mode, the current MV is the same as one of the Merge or Skip candidates. The selected Merge/Skip candidate is identified by explicit signaling or by inferring. When a block is coded in the Merge mode, the prediction residual is transmitted. When a block is coded in the Skip mode, the prediction residual is not transmitted. The Merge/Skip neighboring candidates can be the same as those used in HEVC Merge/Skip mode. The Merge/Skip neighboring candidates can also be different from those used in HEVC Merge/Skip mode. For example, the Merge/Skip neighboring candidates may correspond to the current IntraBC MV predictor, one or more last coded IntraBC MVs, or a MV from top or left PU.

For the eligibility of being a candidate for the MV in Merge/Skip mode for a block coded using the IntraBC mode, similar considerations for the block vector for IntraBC is applicable. In one embodiment, for a current block (i.e., PU) coded in the IntraBC mode, the MV (BV) of a neighboring block can be regarded as a valid candidate for the Merge/Skip mode only if the neighboring block is coded in the IntraBC mode. Similarly, for a current block coded in the Inter mode, the MV of a neighboring block can be regarded as a valid candidate for the Merge/Skip mode only if the neighboring block is coded in the Inter mode.

In the above example of Merge/Skip candidate derivation, the motion vector associated with a neighboring block is regarded as valid only if the neighboring block is coded in the same prediction mode (i.e., Inter or IntraBC mode) as the current block. Nevertheless, the MV of an Inter coded neighboring PU may also be regarded as a valid MV predictor for the current IntraBC PU. Similarly, the MV of an IntraBC coded neighboring PU may also be regarded as a valid MV predictor for the current Inter PU.

Motion (or Block) Vector Representation of IntraBC Blocks.

The IntraBC technique adopted into the HEVC standard allows only integer block vectors. In the present invention, the ibc_ref_pic is treated in the same way as an Inter reference picture. Accordingly, the block vector representation as well as coding mechanism can be the same as that for motion vectors in Inter prediction. As a consequence, sub-pel block vectors are allowed, processed and signaled in the same way as sub-pel motion vectors. Interpolation filters and other filters (e.g. SAO) can be applied to both the Inter region and the Intra region in the ibc_ref_pic.

Yet in another embodiment, the Intra region of ibc_ref_pic can be restricted to allow only integer block vectors. At the same time, the interpolation filter and other filters which are applied to Inter prediction are not applied to the Intra region of ibc_ref_pic.

In one embodiment, the split of Intra and Inter regions of the ibc_ref_picture is not signaled. Instead, the split of Intra and Inter regions of the ibc_ref_picture is inferred by the position of the block that is currently being predicted or coded. In this embodiment, all the blocks or areas which are before the current block in coding order are considered as Intra region; all the blocks or areas which are after the current block in coding order are considered as Inter region.

The performance of a video coding system including an IntraBC prediction mode incorporating an embodiment of the present invention is compared to the performance of a conventional system as shown in Table 1 and Table 2 under various system configurations (i.e., All Intra, Random Access and Low Delay B Picture). The conventional system corresponds to the system based on HEVC Screen Content Coding Test Model 2 (SCM 2). The system incorporating an embodiment of the present invention for Table 1 corresponds to a system using a reference picture list including an IntraBC reference picture, and applying AMVP, MVD, Merge/Skip mode to IntraBC coded block. The system incorporating an embodiment of the present invention for Table 2 corresponds to a system using a reference picture list including an IntraBC reference picture, and applying block vector predictor (BVP), block vector difference (BVD), Merge/Skip mode to IntraBC coded block, where the BVP and BVD are different from AMVP and MVD. The BVP and BVD are designated for the IntraBC coded PU. The performance comparison is based on different sets of test data listed in the first column. A negative value in the BD-rate implies that the present invention has a better performance. As shown in Table 1, the present invention may achieve as high as 4.0% BD-rate reduction for luma samples and as high as 5.6% BD-rate reduction for chroma samples. As shown in Table 2, the present invention may achieve as high as 5.5% BD-rate reduction for luma samples and as high as 7.3% BD-rate reduction for chroma samples.

TABLE 1

| | All Intra | | | Random Access | | | Low delay B | | |
|---|---|---|---|---|---|---|---|---|---|
| | G/Y | B/U | R/V | G/Y | B/U | R/V | G/Y | B/U | R/V |
| RGB, text & graphics with motion, 1080p | −2.1% | −3.7% | −3.8% | −3.7% | −5.6% | −5.6% | −3.8% | −5.3% | −5.2% |
| RGB, text & graphics with motion, 720p | −1.1% | −2.1% | −2.0% | −1.2% | −2.6% | −2.6% | −0.8% | −2.0% | −2.1% |
| RGB, mixed content, 1440p | −1.6% | −2.0% | −2.2% | −1.2% | −2.4% | −2.5% | −1.0% | −2.1% | −2.1% |
| RGB, mixed content, 1080p | −1.2% | −1.9% | −1.9% | −1.1% | −2.6% | −2.8% | −1.1% | −2.8% | −2.6% |
| RGB, Animation, 720p | 0.1% | 0.1% | 0.1% | 0.0% | −0.1% | −0.1% | 0.1% | 0.0% | 0.2% |
| RGB, camera captured, 1080p | 0.1% | 0.1% | 0.1% | −0.2% | −0.1% | −0.2% | 0.0% | 0.0% | 0.0% |
| YUV, text & graphics with motion, 1080p | −0.5% | −2.0% | −2.0% | −3.7% | −5.4% | −5.5% | −4.0% | −5.6% | −5.4% |
| YUV, text & graphics with motion, 720p | −0.4% | −1.3% | −1.6% | −0.7% | −2.2% | −2.2% | −0.8% | −1.6% | −2.3% |
| YUV, mixed content, 1440p | −0.8% | −1.5% | −1.8% | −0.9% | −2.5% | −2.4% | −0.9% | −2.5% | −2.1% |
| YUV, mixed content, 1080p | −0.7% | −2.1% | −2.2% | −0.9% | −3.3% | −3.3% | −1.1% | −4.6% | −5.4% |
| YUV, Animation, 720p | 0.0% | 0.1% | 0.0% | 0.0% | 0.0% | 0.0% | 0.2% | −0.1% | 0.6% |
| YUV, camera captured, 1080p | 0.1% | 0.2% | 0.1% | −0.1% | 0.1% | 0.0% | 0.0% | 0.0% | 0.0% |

TABLE 2

| | All Intra | | | Random Access | | | Low delay B | | |
|---|---|---|---|---|---|---|---|---|---|
| | G/Y | B/U | R/V | G/Y | B/U | R/V | G/Y | B/U | R/V |
| RGB, text & graphics with motion, 1080p | −4.5% | −6.0% | −5.9% | −5.3% | −7.3% | −7.0% | −5.5% | −7.0% | −6.8% |
| RGB, text & graphics with motion, 720p | −2.4% | −3.4% | −3.3% | −2.1% | −3.5% | −3.5% | −1.6% | −2.8% | −2.9% |
| RGB, mixed content, 1440p | −2.3% | −2.7% | −2.9% | −1.9% | −3.0% | −3.2% | −1.6% | −2.8% | −2.8% |
| RGB, mixed content, 1080p | −2.0% | −2.7% | −2.7% | −2.0% | −3.3% | −3.4% | −1.9% | −3.2% | −3.3% |
| RGB, Animation, 720p | −0.1% | −0.1% | 0.0% | 0.0% | −0.2% | −0.2% | −0.1% | −0.2% | −0.1% |
| RGB, camera captured, 1080p | 0.1% | 0.0% | 0.0% | 0.0% | 0.0% | 0.0% | 0.0% | −0.1% | 0.0% |
| YUV, text & graphics with motion, 1080p | −2.4% | −4.0% | −3.9% | −4.8% | −6.6% | −6.6% | −5.3% | −6.8% | −6.6% |
| YUV, text & graphics with motion, 720p | −1.7% | −2.7% | −3.0% | −1.6% | −3.0% | −3.2% | −1.6% | −2.6% | −3.2% |
| YUV, mixed content, 1440p | −1.7% | −2.3% | −2.6% | −1.6% | −3.2% | −3.3% | −1.5% | −3.4% | −2.7% |
| YUV, mixed content, 1080p | −1.6% | −3.0% | −3.1% | −1.7% | −3.9% | −4.4% | −1.6% | −5.2% | −6.4% |
| YUV, Animation, 720p | −0.1% | −0.2% | −0.2% | 0.0% | −0.3% | −0.3% | 0.0% | −0.4% | −0.2% |
| YUV, camera captured, 1080p | 0.1% | 0.1% | 0.1% | 0.0% | 0.3% | 0.0% | 0.0% | −0.1% | 0.0% |

Figure 3:
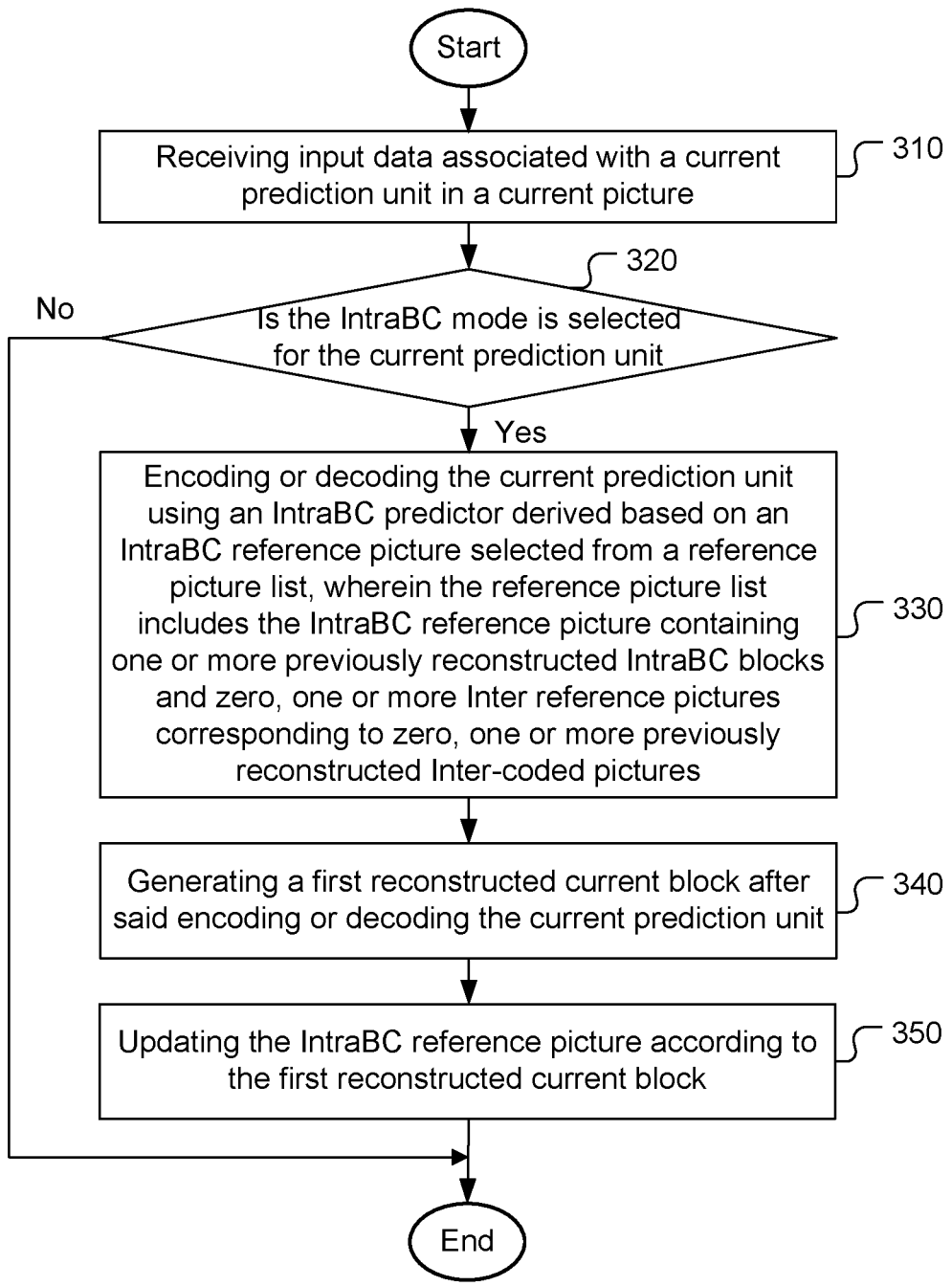
FIG. 3 illustrates a flowchart of an exemplary coding system incorporating an embodiment of the present invention, where the reference picture list includes an IntraBC reference picture.

FIG. 3 illustrates a flowchart of an exemplary coding system incorporating an embodiment of the present invention, where the reference picture list includes an IntraBC reference picture. The system receives input data associated with a current prediction unit in a current picture as shown in step 310. For encoding, the input data corresponds to pixel data to be encoded. For decoding, the input data corresponds to coded pixel data to be decoded. The input data may be retrieved from memory (e.g., computer memory, buffer (RAM or DRAM) or other media) or from a processor. Whether the IntraBC mode is selected for the current prediction unit is checked in step 320. If the result is "Yes", steps 330, 340 and 350 are performed. If the result is "No", the process skips steps 330, 340 and 350. In step 330, the current prediction unit is encoded or decoded using an IntraBC predictor derived based on an IntraBC reference picture selected from a reference picture list. The reference picture list includes the IntraBC reference picture containing one or more previously reconstructed IntraBC blocks and zero, one or more Inter reference pictures corresponding to zero, one or more previously reconstructed Inter-coded pictures. In step 340, a first reconstructed current block is generated after said encoding or decoding the current prediction unit. In step 350, the IntraBC reference picture is updated according to the first reconstructed current block.

Figure 4:
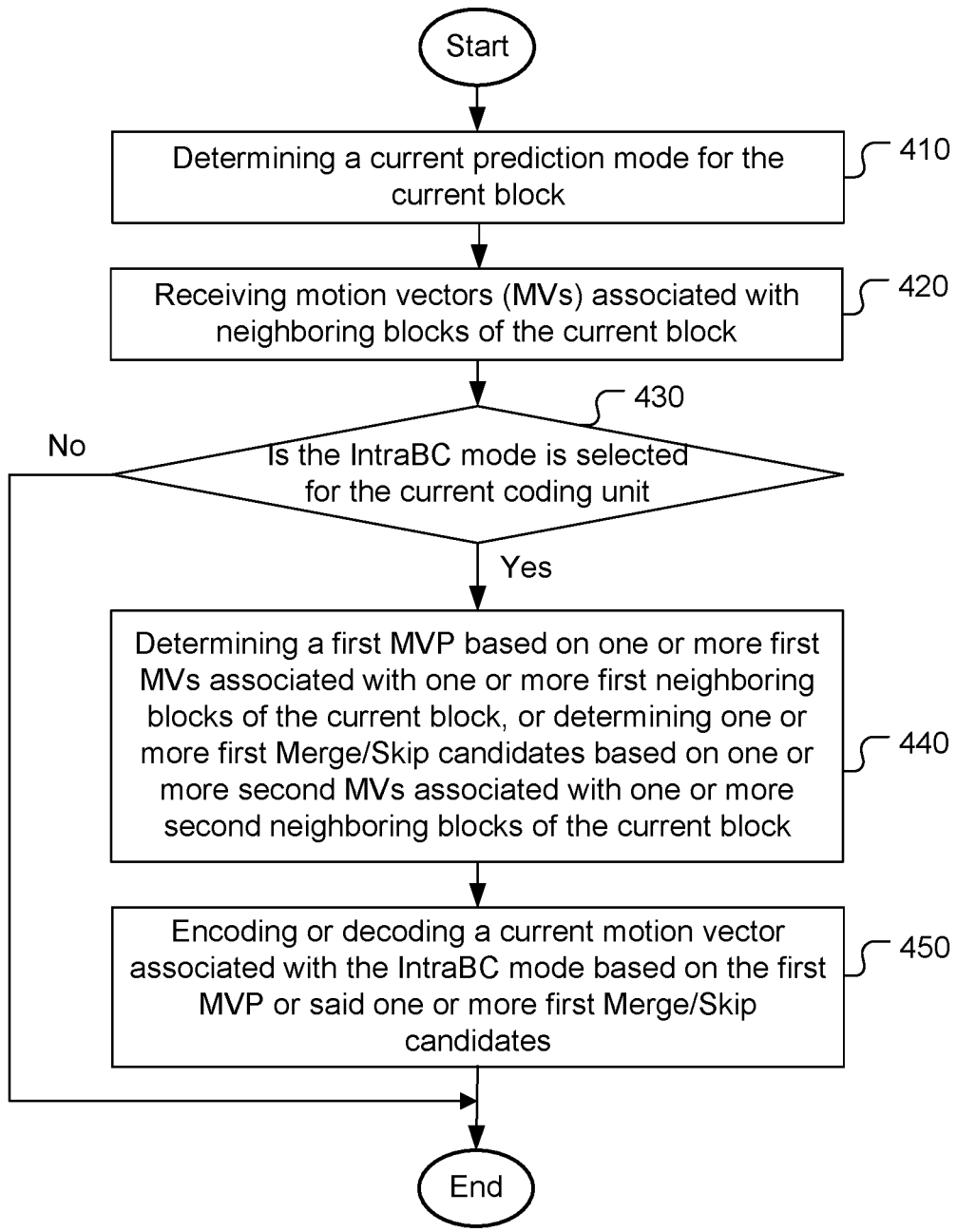
FIG. 4 illustrates a flowchart of an exemplary coding system incorporating an embodiment of the present invention, where the motion vector predictor (MVP) or one or more Merge/Skip candidates for the MV of the current block coded in the IntraBC mode.

FIG. 4 illustrates a flowchart of an exemplary coding system incorporating an embodiment of the present invention, where the motion vector predictor (MVP) or one or more Merge/Skip candidates for the MV of the current block coded in the IntraBC mode. A current prediction mode is determined for the current block in step 410. Motion vectors (MVs) associated with neighboring blocks of the current block are received in step 420. Whether the IntraBC mode is selected for the current coding unit is checked in step 430. If the result is "Yes", steps 440 and 450 are performed. If the result is "No", the process skips steps 440 and 450. In step 440, a first MVP is determined based on one or more first MVs associated with one or more first neighboring blocks of the current block, or determining one or more first Merge/Skip candidates based on one or more second MVs associated with one or more second neighboring blocks of the current block. In step 450, a current motion vector associated with the IntraBC mode is encoded or decoded based on the first MVP or said one or more first Merge/Skip candidates.

The flowcharts shown above are intended to illustrate examples of IntraBC coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of signaling of coding mode including an IntraBC mode (Intra-block copy mode) and inter prediction mode for a picture, wherein the picture is divided into multiple coding units, the method comprising:
receiving input data associated with a current prediction unit in a current picture;
responsive to the IntraBC mode being selected for the current prediction unit,
encoding or decoding the current prediction unit using an IntraBC predictor derived based on an IntraBC reference picture selected from a reference picture list, wherein
the IntraBC reference picture is included in the reference picture list as a reference picture and is placed as a last reference picture in the reference picture list,
the reference picture list corresponds to reference picture list l0 or reference picture list l1, and
the reference picture list includes the IntraBC reference picture containing one or more previously reconstructed blocks in the current picture and includes one or more Inter reference pictures corresponding to one or more previously reconstructed Inter-coded pictures;
generating a first reconstructed current block after said encoding or decoding the current prediction unit; and
updating the IntraBC reference picture according to the first reconstructed current block.

2. The method of claim 1, wherein the IntraBC reference picture is included in the reference picture list as a new reference picture.

3. The method of claim 2, wherein responsive to the IntraBC reference picture being included in the reference picture list as the new reference picture, the IntraBC reference picture is initialized as an empty picture.

4. The method of claim 1, wherein the first reconstructed current block is filtered using a filter before the first reconstructed current block is used to update the IntraBC reference picture.

5. The method of claim 4, wherein the filter corresponds to sample adaptive offset (SAO).

6. The method of claim 1, wherein the IntraBC predictor is derived based on the IntraBC reference picture using a motion vector in sub-pel accuracy.

7. The method of claim 1, further comprising in response to the Inter prediction mode being selected for the current prediction unit:
encoding or decoding the current prediction unit using an Inter predictor derived based on at least one Inter reference picture selected from the reference picture list;
generating a second reconstructed current block after said encoding or decoding the current prediction unit; and
updating the IntraBC reference picture according to the second reconstructed current block.

8. The method of claim 1, wherein the IntraBC reference picture is included in the reference picture list by replacing one existing Inter reference picture.

9. The method of claim 8, wherein responsive to the IntraBC reference picture being included in the reference picture list by replacing one existing Inter reference picture, the IntraBC reference picture is initialized as said one existing Inter reference picture.

10. An apparatus for signaling of coding mode including an IntraBC mode (Intra-block copy mode) and inter prediction mode for a picture, wherein the picture is divided into multiple coding units, the apparatus comprising:
one or more electronic circuits configured to:
receive input data associated with a current prediction unit in a current picture;
responsive to the IntraBC mode being selected for the current prediction unit,
encode or decode the current prediction unit using an IntraBC predictor derived based on an IntraBC reference picture selected from a reference picture list, wherein
the IntraBC reference picture is included in the reference picture list as a reference picture and is placed as a last reference picture in the reference picture list,
the reference picture list corresponds to reference picture list 10 or reference picture list 11, and
the reference picture list includes the IntraBC reference picture containing one or more previously reconstructed blocks in the current picture and includes one or more Inter reference pictures corresponding to one or more previously reconstructed Inter-coded pictures;
generate a first reconstructed current block after said encoding or decoding the current prediction unit; and
update the IntraBC reference picture according to the first reconstructed current block.

11. The apparatus of claim 10, wherein the one or more electronic circuits are configured to include the IntraBC reference picture in the reference picture list as a new reference picture.

12. The apparatus of claim 11,
wherein responsive to the IntraBC reference picture being included in the reference picture list as the new reference picture, the IntraBC reference picture is initialized as an empty picture.

13. The apparatus of claim 10, wherein the one or more electronic circuits are configured to include the IntraBC reference picture in the reference picture list by replacing one existing Inter reference picture.

14. The apparatus of claim 13,
wherein responsive to the IntraBC reference picture being included in the reference picture list by replacing one existing Inter reference picture, the IntraBC reference picture is initialized as said one existing Inter reference picture.

15. A non-transitory computer medium comprising machine-readable software code that, when executed by one or more processors, causes the one or more processors to implement a method of signaling of coding mode including an IntraBC mode (Intra-block copy mode) and inter prediction mode for a picture, wherein the picture is divided into multiple coding units, the method comprising:
receiving input data associated with a current prediction unit in a current picture;
responsive to the IntraBC mode being selected for the current prediction unit,
encoding or decoding the current prediction unit using an IntraBC predictor derived based on an IntraBC reference picture selected from a reference picture list, wherein
the IntraBC reference picture is included in the reference picture list as a reference picture and is placed as a last reference picture in the reference picture list,
the reference picture list corresponds to reference picture list 10 or reference picture list 11, and
the reference picture list includes the IntraBC reference picture containing one or more previously reconstructed blocks in the current picture and includes one or more Inter reference pictures corresponding to one or more previously reconstructed Inter-coded pictures;
generating a first reconstructed current block after said encoding or decoding the current prediction unit; and
updating the IntraBC reference picture according to the first reconstructed current block.

* * * * *